Aug. 3, 1954   M. WATTER   2,685,261
ENGINE MOUNTING MEANS
Filed Sept. 15, 1951   2 Sheets-Sheet 1

INVENTOR.
Michael Watter
BY
Maurice A. Crews
ATTORNEY

Aug. 3, 1954　　　　M. WATTER　　　2,685,261
ENGINE MOUNTING MEANS
Filed Sept. 15, 1951　　　　　　　　2 Sheets-Sheet 2
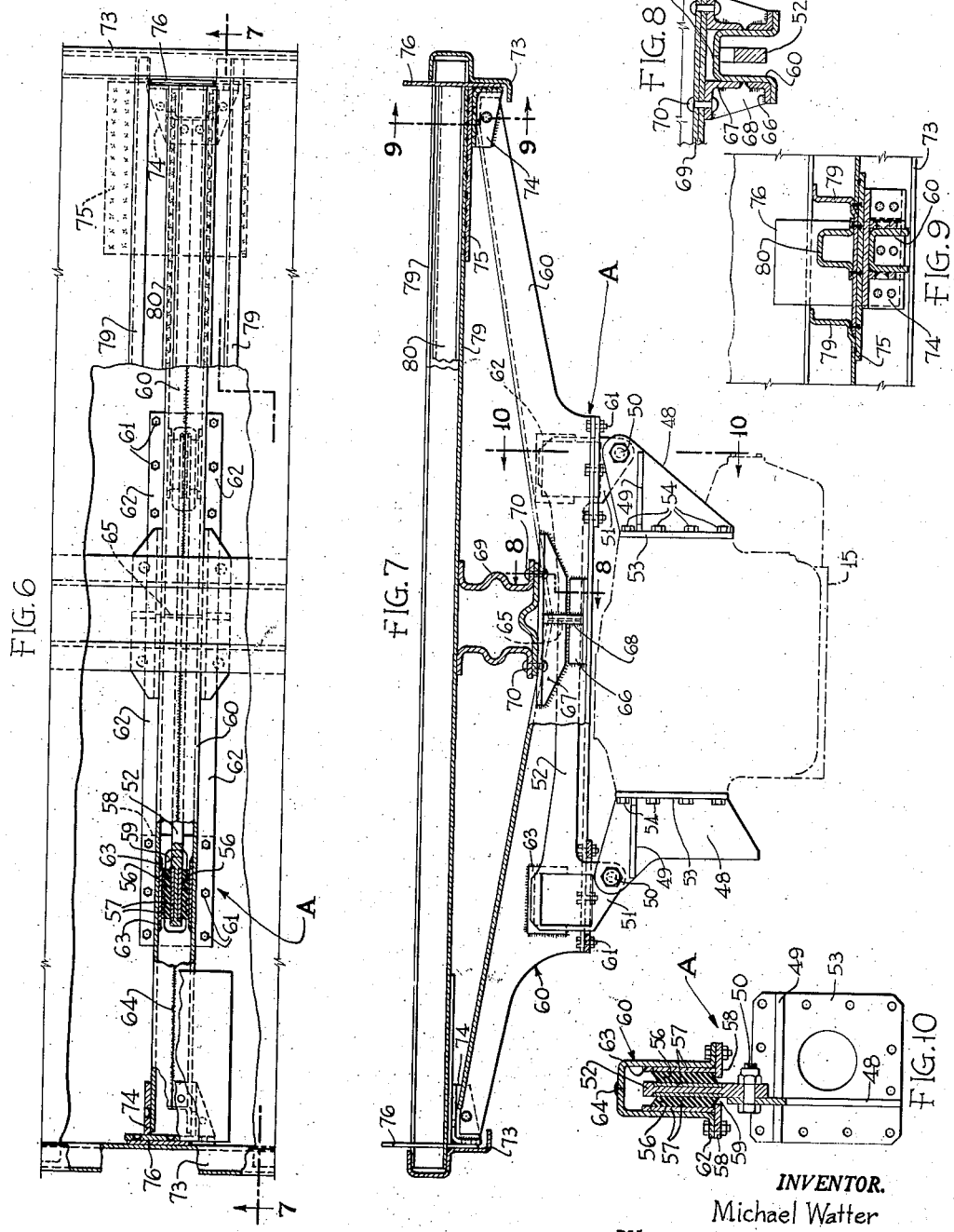
INVENTOR.
Michael Watter
BY
Maurice A. Crews
ATTORNEY

Patented Aug. 3, 1954

2,685,261

UNITED STATES PATENT OFFICE 2,685,261

ENGINE MOUNTING MEANS

Michael Watter, Philadelphia, Pa., assignor to The Budd Company, Philadelphia, Pa., a corporation of Pennsylvania Application September 15, 1951, Serial No. 246,764

6 Claims. (Cl. 105—133)

This invention relates to engine mounting means, especially to means for mounting an engine beneath the floor of a railway passenger car, and has for an object the provision of improvements in this art.

The present invention is related to the same general type of car construction as that of the copending application of Albert G. Dean, Serial No. 123,654, filed October 26, 1949, now Patent No. 2,650,548, September 1, 1953, and assigned to the assignee of the present invention.

According to the invention disclosed in the earlier application, an engine was mounted beneath a car in such manner as to be easily removed by lifting on a carriage, releasing from its anchorages, lowering upon the carriage, and rolling it sidewise from beneath the car. The engine supporting means for the outboard or driving end of the engine comprised a yoke carried by resilient pads, as of rubber, disposed in a vertical transverse plane so as to resiliently and strongly resist endwise or axial movements of the engine, the pads being carried by a transverse beam-like structure secured to the center sill and side sill of the car and braced by reinforcement in the car floor. The mounting for the inboard end of the engine comprised a resilient pad disposed in a horizontal plane and mounted on a swingable bail which could be swung from beneath an engine part, the bail being secured beneath the floor at a transverse reinforcement.

The mounting of the earlier application was very efficient from the engine operation standpoint and provided very convenient removal of the engine, but the inboard mounting at times transmitted vibration and noise into the car floor which caused some annoyance to passengers.

It is the aim of the present invention to provide an inboard mounting which will minimize the transmission of vibration and noise into the car and which will cooperate effectively with the outboard mounting to provide efficient operation and easy removal of the engine.

Another object is to provide a mounting which has great strength with minimum weight and cost.

The above and other objects of the invention will be apparent from the following description of an exemplary embodiment thereof, reference being made to the accompanying drawings, wherein:

Fig. 6 is an enlarged plan view, partly in section at the zone 6—6 of Fig. 1, showing the outboard mounting;

Fig. 7 is a transverse vertical section taken on the line 7—7 of Fig. 6;

Fig. 8 is a longitudinal vertical section taken on the line 8—8 of Fig. 7;

Fig. 9 is a longitudinal vertical section taken on the line 9—9 of Fig. 7; and

Fig. 10 is a longitudinal vertical section taken on the line 10—10 of Fig. 7.

The general arrangement of the engine beneath the car is the same as in the earlier application and need not be detailed here. It is sufficient to know that the engine is mounted on the inboard side of a car truck and drives one or more axles of the truck through its main drive shaft and suitable flexible shaft connections. The car truck is not illustrated in the present application.

Figure 1:
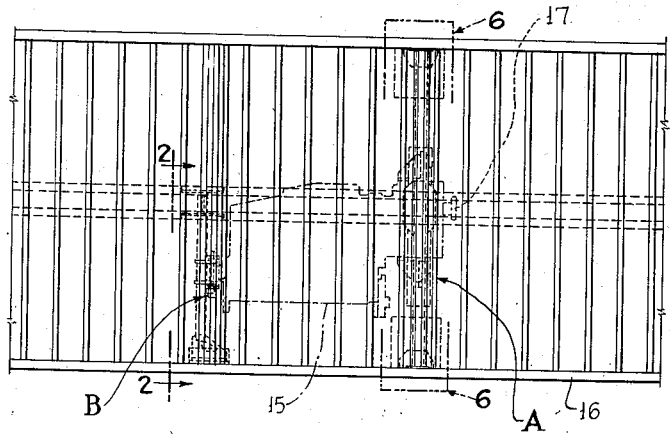
Fig. 1 is a top plan view showing the arrangement of the engine in relation to the floor of a car.
Figure 2:
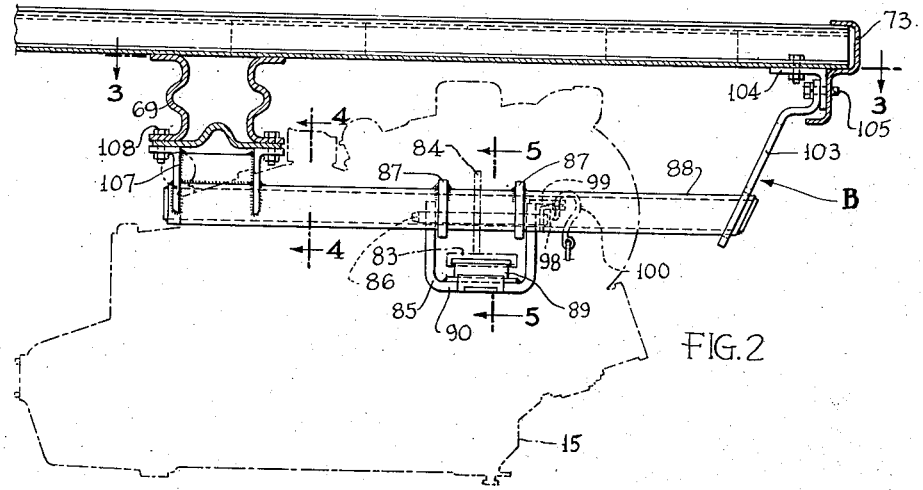
Fig. 2 is an enlarged transverse vertical section, taken on the line 2—2 of Fig. 1, showing the improved inboard engine mount.
Figure 3:
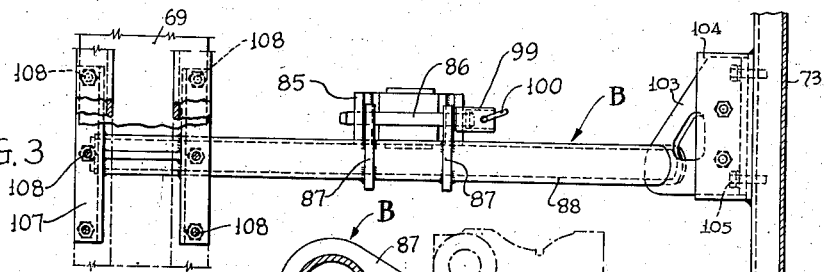
Fig. 3 is a horizontal section taken on the line 3—3 of Fig. 2.
Figure 4:
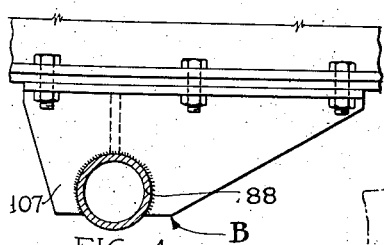
Fig. 4 is a further enlarged longitudinal vertical section taken on the line 4—4 of Fig. 2.
Figure 5:
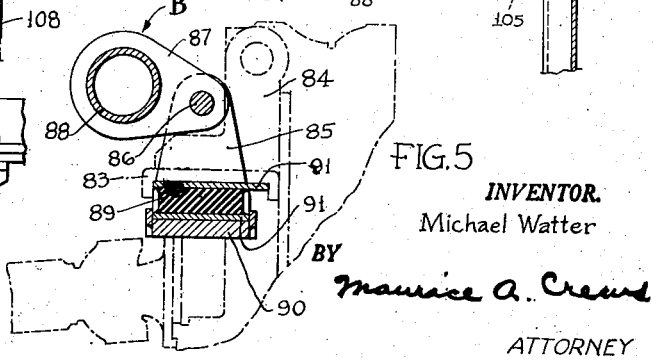
Fig. 5 is a further enlarged longitudinal vertical section taken on the line 5—5 of Fig. 2.

As shown in Fig. 1, an engine unit 15, supported beneath the floor of a car 16 by means presently to be described, drives the wheels of the car through a drive shaft 17. The outboard support at the drive shaft end of the engine is generally designated by the letter A and is detailed in Figs. 6 to 10; and the inboard support for the engine, which is specifically improved according to the present invention and detailed in Figs. 2 to 5, is designated by the letter B.

The copending application discloses how the engine is connected in the operative assembly and, since the general environment is the same, need not be described here.

The engine support is of the three-point type, having a two-point support at the outboard end which furnishes strong resistance against turning torque imposed on the drive shaft and which takes end thrust incident to starting and stopping with some resilience but without extensive movement of the engine unit. It is well adapted, because of its longitudinal strength and stiffness, to resist the longitudinal impact loads of coupling and the sudden starts and stops incident to railroad vehicle operation. The inboard mounting, comprising a single support, is required to carry only vertical loads and provides swinging movement without strongly resisting.

Considering first the outboard mounting and referring to Figs. 6 to 10, the engine unit 15 is provided on the sides with support ears 48 having rigidifying ribs 49, the ears being secured, as by bolts 50, to the depending ears 51 of a floating anchor yoke 52. The ears 48 of the engine unit may be formed on plates 53 which are attached to the engine unit frame by suitable means such for example as bolts 54.

The yoke 52 is resiliently supported, as by rubber pads 56 carried between plates 57 which are integrally bonded thereto, the pads and plates together forming sandwich units which can be separately made and assembled. As best shown in Fig. 10, the inner plates 57 are set in recesses or niches cut in the sides of the yoke member 52 while the outer plates 57 rest on a support plate 58 at the sides of an oversized opening 59 therein through which the depending ears 51 extend. The plates 58 are supported by a transverse beam 60 mounted on the car underframe, the plates being secured beneath the beam, as by bolts 61 in out-turned flanges 62 of the beam. The uncut portion of the plates 58 underlie the yoke 52 and are adapted to serve as safety supports for the yoke 52 in case the rubber pads 56 fail or yield unduly. On the inner sides the beam 60 has secured thereto, as by welding, inverted U-shaped members 63 which fit around the tops and down along the upper part of the sides of the outer sandwich plates 57 to hold them against upward and sidewise movement. Both plates 57 of the resilient units are thus socketed to resist movement in all directions relative to their supporting members.

The beam 60, for convenience, may be formed of four main parts welded together along a longitudinal seam 64 and a transverse seam 65. At the mid-portion of the beam on each side there are welded on and welded together a lower angle piece 66, an upper angle piece 67 and a strut plate 68, and the side flanges of the upper angle pieces are secured to the center sill 69 of the car as by rivets 70.

At the outer ends the beam 60 is secured to the side sills 73 of the car, as by brackets 74 which are plug welded to a horizontal stiffening plate 75 and to a vertical stiffening plate 76, which stiffening plates are in turn welded to the adjacent parts of the car.

At this location the regular floor pans, built up of angular transverse beams 79 (see Fig. 9) are reinforced by a relatively heavy transverse rigidifying beam 80 suitably welded by its lower flanges to the bottom plate portion of one of the members 79, the inverted member 80 forming a box section which strongly resists inward bending of the side sills 73 and buckling of the floor.

The beam 60 and the rigidifying member 80, together with the side sills and floor pan, form in effect an inverted king truss with the center sill acting as the king strut at the apex. In addition, the center sill through the connection at the rivets 70 carries a large part of the load directly. The load is approximately balanced on each side of the center sill. This construction is very strong and rigid even though relatively light parts are used.

At the inboard end, as shown in Figs. 2 to 5, the engine unit 15 is provided with a projecting supporting pad 83 rigidified by a buttress rib 84, and this pad is supported by a swingable member or bail 85 carried by a pivot bolt (or bolts) 86 from brackets 87 rigidly secured on a transverse beam 88 which is supported by the center sill 69 and the side sill 73. A resilient unit or sandwich 89, which as a unit may be identical with those used at the outboard end, is located between the engine pad 83 and the bottom piece or stirrup 90 of the bail, the metal plates 91 of the sandwich being suitably socketed in the adjacent parts.

The floor may be rigidified by transverse reinforcing members or beams 96, as in the earlier application, although the present construction does not definitely require them. The pin 86 is retained in position, as by a bracket 98 on the pin and a bracket 99 on the bail, the brackets having mating holes in which a pin or hook 100 is placed.

The beam 88 is made as a tube so as to be very strong for its weight and so as to be very strong in torsion to resist the side load imposed by the brackets 87 extending from one side of the beam. The outer end of the beam 88 is supported on the side sill through bracket 103, the bracket being secured to the beam 88, as by welding, and secured to the side sill 73 and a local reinforcing angle piece 104 thereof, as by bolts 105. At its inner end the beam is supported on the center sill 69 through a bracket 107, the bracket being secured to the beam 88, as by welding, and secured to the center sill, as by bolts 108. The bracket is made up by side angle pieces united by a central gusset extending along the top of the beam 88.

In action, the resilient supports absorb engine vibrations without transmitting noticeable vibrations to the passengers. The engine cylinder axes are inclined upwardly from a horizontal plane, here the angle being about 20 or 25 degrees, and the supports absorb the horizontal components as well as the vertical components of engine vibrations. For side movement, all resilient pads are placed in shear along the flat. For vertical movement, the outboard mounting pads are placed in shear along the flat and the inboard mounting pad is placed in compression across its thin dimension. For longitudinal movement parallel to the longitudinal axis of the car, the inboard mounting pad is placed in slight shear along the flat but the bail swings to relieve it so this movement is absorbed in compression across the flat in the outboard mounting pads. Such longitudinal loads are transmitted largely into the center sill with some in the side sill. Driving torque of the engine shaft is placed largely on the transversely spaced outboard mountings which are located near the center of the car on opposite sides of the side sill, the drive shaft being disposed almost exactly along the central longitudinal vertical plane through the center sill of the car, hence torque loads are quickly absorbed in the strong rigid part of the car and passed into the trucks.

The rigid tubular inboard beam 88 secured between the center sill and side sill avoids supporting the end of the engine from the floor and eliminates most of the engine noise and vibration from the floor. The arrangement of the brackets 87 at the side of the beam and at its level keeps the engine support high, as is required, and the tubular beam strongly resists torsion caused by this side loading without appreciable twisting. The inward inclination of the bracket 103 at the outer end of the beam brings this end clear of the outer side of the car.

To remove the engine, a lift conveyor is run in under the engine and lift jacks on the conveyor are engaged with the engine unit at lift pads provided thereon. There are three lift pads, each located near a suspension point of the engine. The jacks are operated to take the weight of the engine unit and to lift it slightly, whereupon the bolts 50 at the outboard end and the bolt 86 at the inboard end are removed. The engine shafts and service line connections are understood to have been disconnected. The jacks are now turned to lower the engine unit until it clears all obstructions, after which it may be run out sideways on the conveyor until it clears the car and its tracks.

The invention provides a simple, efficient and strong support for an engine unit and a support which permits the unit to be installed or removed very quickly.

The single support at the inboard end allows large tolerances in manufacture. It can be mislocated by a large amount without interfering with the action of the suspension. The engine bracket merely rests under its own weight in the support but cannot get out of position, there being means to limit its movement longitudinally, laterally and vertically.

The outboard supports, including the yoke member 52 and related parts, require accurate work with small tolerances but they are so designed and arranged as to make these tolerances easy to maintain and positively locate the attaching elements for easy installation of the engine.

All three supports provide positive mechanical stops both laterally and vertically while the outboard supports provide resilient stops longitudinally, the resilient stops being rigidly backed by very strong structural parts.

While a specific form of the invention has been illustrated and described it is to be understood that there may be various embodiments within the scope of the invention.

What is claimed is:

1. Mounting means for an engine unit on a vehicle having longitudinal center and side sills and in which the engine has a longitudinally extending drive shaft, comprising in combination, resilient mounting pads at the drive shaft end of the engine unit, one on each side of the drive shaft, said pads being arranged flatwise in a vertical plane transverse to the engine drive shaft axis and perpendicular to the line of movement of the vehicle, a resilient mounting pad at the other end of the engine unit arranged flatwise longitudinally of the engine shaft axis, and supporting means for said mounting pad at the other end of the engine comprising a supporting beam for the pad anchored to the center and side sills and standing free of the vehicle floor between said center and side sills, the beam including a support element intermediate its length for said pad.

2. Mounting means for an engine unit on a vehicle having longitudinal center and side sills and in which the engine has a longitudinally extending drive shaft, comprising in combination, resilient mounting pads at the drive shaft end of the engine unit arranged flatwise in a vertical plane transverse to the engine drive shaft axis and perpendicular to the line of movement of the vehicle, and a resilient mounting pad at the other end of the engine unit arranged flatwise longitudinally of the engine shaft axis, supports for the pads at the drive shaft end connected to take end thrust loads, and a support for the pad at the other end which swings with endwise movement of the engine unit so that it is relieved of end thrust loads, said support for said mounting pad at the other end of the engine comprising a supporting beam for the pad anchored to the center and side sills and standing free of the vehicle floor between said center and side sills, the beam including a support element intermediate its length for said pad.

3. Mounting means for mounting an engine unit beneath a railway car, comprising in combination with an engine unit connected by a longitudinal shaft to drive an axle of the car truck, spaced supports for the engine unit at its drive shaft end, the car having a floor, a center sill and side sills, an inverted king truss carrying resilient engine supporting elements supporting said spaced engine supports, said truss being anchored at its apex to the center sill and at its ends to the side sills, and a suspension support including a resilient pad for the other end of the engine, the suspension support at the said other end comprising a beam supported between the center and side sills and standing free of the vehicle floor between said center and side sills, the beam including a support element intermediate its length for said pad.

4. Mounting means for an engine unit beneath a vehicle floor supported on spaced longitudinal sills, comprising in combination, supports for one end of the engine unit carried by the sills clear of the floor and strongly and resiliently opposing end thrust along the longitudinal axis of the engine unit, and a swingable support for the other end of the engine unit, the swingable support carrying a resilient engine supporting pad and being carried on a pivot mounting secured at the side of a tubular beam carried between the vehicle sills and free of the vehicle floor between said sills.

5. Mounting means for an engine unit, beneath a vehicle floor supported on spaced longitudinal sills, comprising in combination, beams at each end of the engine unit carried by said sills, and suspension connections including resilient elements between the beams and the engine unit and free of the vehicle floor between sills, the beam at one end of the engine being in the form of a rigid tube secured to spaced sills and free of the floor between sills, a bracket on the side of the tube and extending generally horizontally therefrom and a supporting element carrying a resilient pad carried by said bracket and supporting a carrying element of the engine unit.

6. Mounting means for an engine unit beneath a vehicle floor supported on center and side sills, comprising in combination, beams at each end of the engine unit carried by said sills, and suspension connections including resilient supporting elements between the beams and the engine unit, the beam at one end of the engine unit being tubular and carried by brackets at its ends below the sills and being provided with an intermediate laterally extending side bracket, the beam being free of the floor between its ends, and a swingable bail carrying a resilient pad supporting the end of the engine unit from said intermediate bracket.

References Cited in the file of this patent

UNITED STATES PATENTS

| Number | Name | Date |
|---|---|---|
| 1,132,727 | Levin | Mar. 23, 1915 |
| 1,876,312 | Morch | Sept. 6, 1932 |
| 2,083,277 | Scott | June 8, 1937 |
| 2,190,144 | Blomberg et al. | Feb. 13, 1940 |
| 2,650,548 | Dean | Sept. 1, 1953 |

OTHER REFERENCES

Ser. No. 288,972, Julien et al. (A. P. C.), published May 25, 1943; now abandoned.